(No Model.)  5 Sheets—Sheet 1.

J. H. JONES.
CORN PLANTING MACHINE.

No. 374,537.  Patented Dec. 6, 1887.

WITNESSES:
A. O. Behel
F. H. Behel

INVENTOR
James Herva Jones
BY Jacob Behel,
ATTORNEY (No Model.) 5 Sheets—Sheet 2.

J. H. JONES.
CORN PLANTING MACHINE.

No. 374,537. Patented Dec. 6, 1887.

WITNESSES:
A. O. Behel
E. H. Behel

INVENTOR
James Hena Jones,
BY Jacob Behel,
ATTORNEY (No Model.) 5 Sheets—Sheet 3.

J. H. JONES.
CORN PLANTING MACHINE.

No. 374,537. Patented Dec. 6, 1887.

WITNESSES:

INVENTOR

ATTORNEY

(No Model.) 5 Sheets—Sheet 4.
J. H. JONES.
CORN PLANTING MACHINE.

No. 374,537. Patented Dec. 6, 1887.

WITNESSES:

INVENTOR

BY

ATTORNEY

(No Model.) 5 Sheets—Sheet 5.

J. H. JONES.
CORN PLANTING MACHINE.

No. 374,537. Patented Dec. 6, 1887.

WITNESSES:
A. O. Behel
F. H. Rihel

INVENTOR
James Herva Jones.
BY Jacob Behel.
ATTORNEY

UNITED STATES PATENT OFFICE.

JAMES HERVA JONES, OF ROCKFORD, ILLINOIS, ASSIGNOR TO EMERSON, TALCOTT & COMPANY, OF SAME PLACE.

CORN-PLANTING MACHINE.

SPECIFICATION forming part of Letters Patent No. 374,537, dated December 6, 1887.

Application filed January 26, 1885. Serial No. 154,020. (No model.)

*To all whom it may concern:*

Be it known that I, JAMES HERVA JONES, a citizen of the United States, residing in the city of Rockford, in the county of Winnebago and State of Illinois, have invented new and useful Improvements in Corn-Planting Machines, of which the following is a specification.

This invention relates to check-row planting-machines in which the seed-dropping mechanism is operated automatically by a knotted wire chain or other equivalent device; and its object is to improve this class of machines, to render them more efficient, and to produce a reliable machine at a reduced cost. To this end I have devised and constructed the machine represented in the accompanying drawings, in which—

The improvements in the machine represented in the accompanying drawings are mainly of a detail character and extend to nearly all parts of the machine.

The main supporting-frame is produced in two sections—a forward or runner portion and a rear or wheel portion. The several parts consisting of the runners A, with open-heel seed-tubes, the transverse bars B and C, the oblique beams D, and tongue E, joined in the manner shown, constitute the runner-frame, which is substantially the same as the runner-frame of planting-machines to be found in the trade. The several parts consisting of the side beams, F, transverse beam G, axle-tree H, and supporting-wheels I, joined in the manner shown, constitute the wheel-frame, substantially such as may be found in like machines now in use. This wheel-frame is hinge-jointed to the runner-frame in the usual manner, and, in connection therewith, constitutes the main supporting-frame of the machine.

The seed-boxes employed in this machine are a combination of wood and iron, and in which the metallic ends K form a portion, K', of the bottom, fitted with suitable bolt-holes on the line of the lengthwise center of the box. The vertical edge portions of these metallic ends are fitted on their inner faces with projecting flanges, forming grooves to receive the vertical ends of the wood sides K'' of the box. The grooved edges of the metallic ends are provided at proper intervals with holes to receive nails to be driven into the end edges of the wood sides to fix the parts in place.

The seed-box is provided with a metallic bar, $a$, spanning the box lengthwise forward of its lengthwise center, and, in connection with the forward wood portion, $a'$, of the lid, is securely fixed in place by means of screw-bolts $a''$, passed downward through the wood lid, the metallic bar, and through metallic ears projecting from the outer face of the metallic ends. The inward-projecting ends $a'''$ of the metallic bars are fitted in journal form, projecting laterally rearward from the bar, and serve as a fulcrum-support of a hand-lever employed to engage the bar connecting the operating-slides of the seed-wheels to operate the seeding mechanism, when the machine is operated by hand, to deposit the seed. The object of this construction is to produce a seed-box at a small cost, of sufficient strength to support the automatic check-row mechanism and successfully resist the strain to which it may be subjected by the check-chain connection when employed as an automatic check or hill row planter.

At L is represented the bed-plate of the seeding mechanism, in which $b$ represents grooves formed in the upper face of the plate to receive the parallel bars of a slide employed to operate the seed-dropping wheel, and the cam-grooves, $b'$, formed therein receive the depending arms of the operating-pawls, and the cam-formed grooves $b''$ receive the depending arms of the detent or stop pawls. This bed-plate L is fitted at $b'''$ with an opening, through which the seed is dropped into the seed-tube connecting with the heel of the runner to be conducted to the furrow opened by the runner. It is also provided with a stud-journal, $c$, rising from the center of its upper face to receive the seed-distributing wheel, and is further provided with bolt-holes $c'$, surrounded with an uprising boss to receive the bottom portion of the metallic ends of the seed-box, which, when in place, also rests on the notched corners $c''$ of the side edges. The bolt-holes $c'$ are in position to coincide with the bolt-holes formed in the bottom portion of the metallic ends of the seed-box when in place on the bed-plate. The under face of the bed-plate L is fitted to engage the upper face of the plate-formed portion $L'$ of the seed-tube, which plate portion is provided with bolt-holes to coincide with the bolt-holes in the bed-plate and in the bottom portions of the metallic ends of the seed-box.

At $d$ are represented parallel side bars, and at $d'$ end bars connecting the side bars, producing a rectangular slide-link of proper dimensions to enter the grooves $b$ in the bed-plate to slide endwise freely therein, so that their upper face shall be substantially in the same plane with the upper surface of the plate. This rectangular slide-link is provided with operating-pawls $d''$, having a pivotal connection with the opposite end portions of the opposite side bars of the link, and these pivoted operating-pawls $d''$ are provided with a depending arm, $d'''$, which enters the cam-grooves $b'$ in the bed-plate and operates to control the lateral movements of the pawls. The rectangular slide-link is also provided with detent-pawls $e$, having a pivotal connection with the end portions of its side bars opposite that to which the operating-pawls are pivoted, and these detent-pawls are provided with a depending arm, $e'$, to enter the cam-grooves $b''$ in the bed-plate, and operate to control the lateral movements of the pawls.

The slide-link is provided centrally on opposite sides with depending jaws $e''$, which extend through openings $e'''$ in the bed-plate and receive the upper end of a flipper-valve of the usual form placed in the seed-tube connecting with the heel of the runner. The end of this slide link is fitted with an uprising stud, $f$, to receive a connecting-bar, $f'$, employed to connect the slide-links on the opposite sides of the machine to cause them to move in unison. It will be noticed that this slide-link is made reversible, and is capable of use on either side of the machine for the purpose of bringing their ends fitted with the stud $f$ inward to receive the connecting-bar $f'$.

At $L''$ is represented a seed-distributing wheel of disk form fitted with a central opening to receive the stud-journal $c$ to rotate thereon. This seed-distributing wheel is fitted with a series of seed-cells, $f''$, to receive the seed and in its rotations discharge it through the seed-opening $b'''$ in the bed-plate. The seed-wheel is provided at proper intervals with teeth $f'''$ projecting from its periphery, to receive the operating and detent pawls of the link-slide, to impart a limited intermittent rotary movement to the seed-wheel in the same direction at each stroke of the link-slide.

Figure 10:
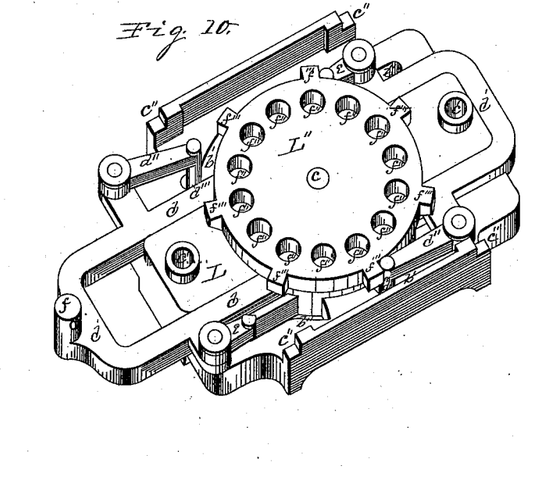
Fig. 10 is an isometrical representation of the seed-distributing mechanism with cut-off bridge-plate removed.
Figures 11, 12:
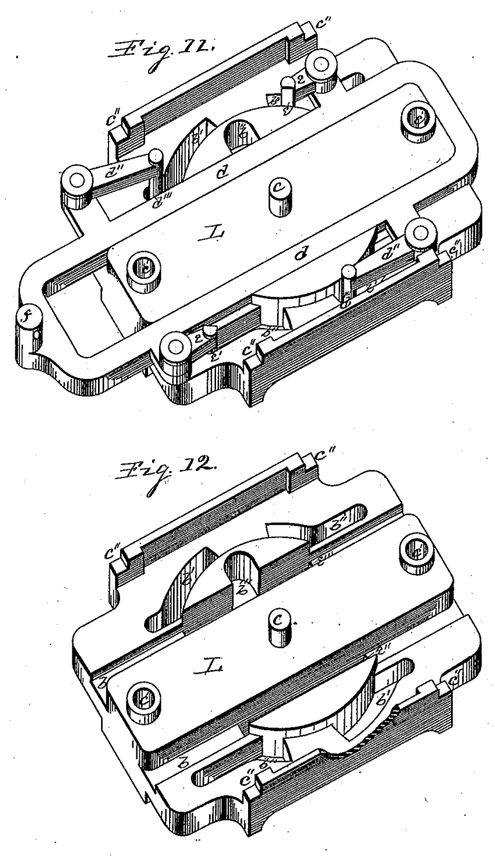
Fig. 11 is an isometrical representation of the seed-distributing mechanism with cut-off bridge-plate and seed-wheel removed.
Fig. 12 is an isometrical representation of the bed-plate of the seeding mechanism.

The construction and arrangement of the bed-plate, the link-slide, and the seed-wheel are such that at each full stroke of the slide each succeeding seed-cell in the series will be carried over the seed-opening in the bed-plate, in which position it will be stopped and held for the time being at each stroke by reason of one of the operating-pawls and one of the detent-pawls engaging the peripheral teeth on opposite sides of the wheel, as shown in Fig. 10. The conformation of the cam-grooves in the bed-plate is such as to control the lateral movements of the pawls to cause them to engage the teeth in a proper manner with certainty at each stroke of the slide.

Figure 8:
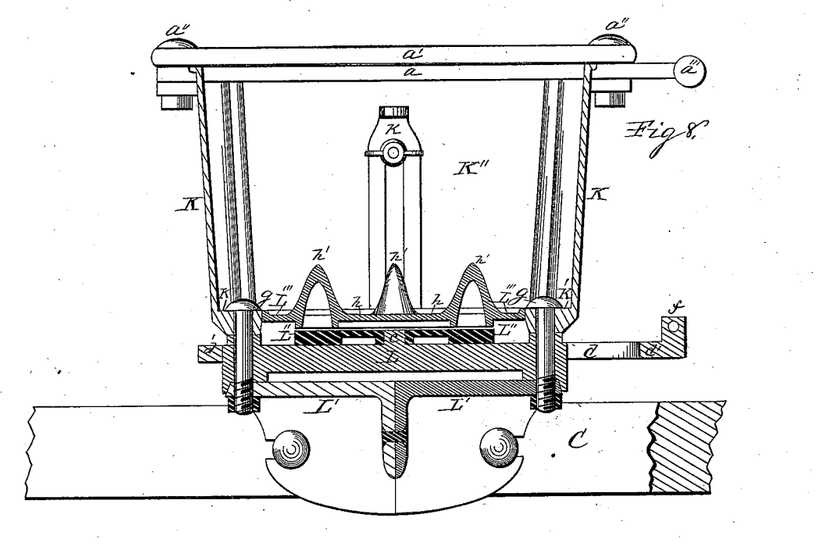
Fig. 8 is a lengthwise vertical central section on dotted line 4 on Fig. 7.
Figure 9:
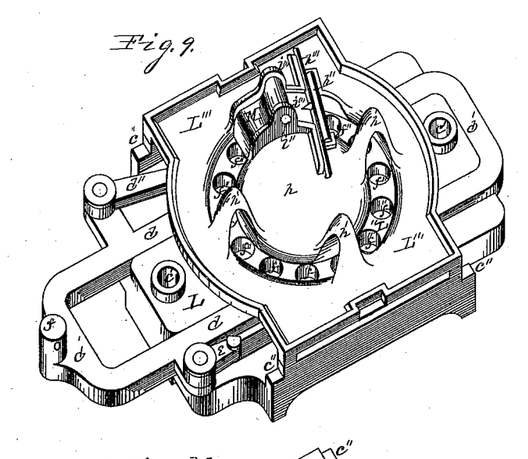
Fig. 9 is an isometrical representation of the seed-distributing mechanism complete.

The several parts consisting of the seed-tube, the bed-plate and link-slide, and the seed-box are placed in position on each other, as shown in Fig. 8, and a single screw-bolt, $g$, at each end is passed downward through the parts and serves to fix them in position with great firmness. The seed-distributing wheel can then be placed in position in the box.

At $L'''$ is represented the outer portion, and at $h$ the inner or center portion, of a shield-plate to the seed-wheel. These portions $L'''$ and $h$ are connected at suitable intervals by arching arms $h'$, spanning an annular opening or space formed between the outer and inner portions of the guard-plate in the line of the seed-cells in the seed-distributing wheel to admit the seed contained in the seed-box to the seed-cells in the seed-wheel.

Figure 13:
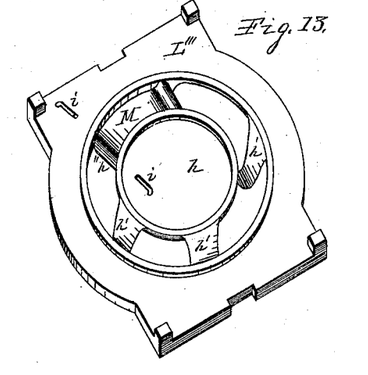
Fig. 13 is an isometrical under face representation of the cut-off bridge-plate.
Figure 14:
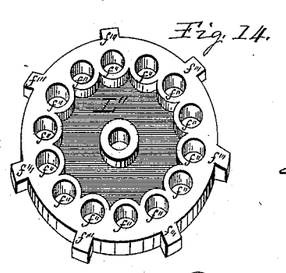
Fig. 14 is an isometrical under face representation of the seed-distributing wheel.
Figure 15:
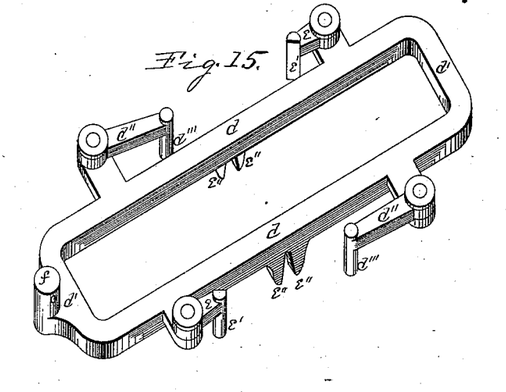
Fig. 15 is an isometrical representation of the slide to operate the seed-wheels.
Figure 16:
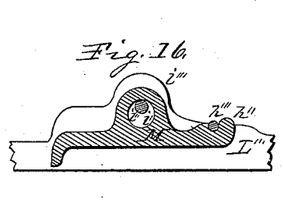
Fig. 16 is a vertical section of the cut-off on dotted line 5 on Fig. 7.
Figure 17:
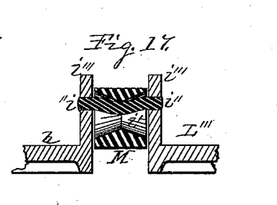
Fig. 17 is a transverse vertical section of the cut-off on dotted line 6 on Fig. 7.

At M is represented a spring-actuated lever cut-off fitted to the annular opening in the guard-plate, and is hinge-jointed at $h''$ to the plate, and is held in its hinged connection therewith by means of a spring-rod, $h'''$, spanning the cut-off forward of its hinged connection with the plate, and having its end portions, $i$, passed through the plate and clinched, as shown at Fig. 13. The center portion of the lever cut-off is provided at $i'$ with a transverse opening of hour-glass form, being of less diameter at its center than at the outer faces of the cut-off. A pin, $i''$, is passed through the ears $i'''$, rising from the inner and outer portions of the guard-plate on the opposite sides of the cut-off, and through the hour-glass opening in the cut-off, and serves to support its free end in a flexible manner in position relatively with the seed-wheel and in a manner to cut off the seed from the cell passing under its free end, and also to override obstructions carried by the seed-wheel and prevent cutting the seed between the end of the cut-off and the edge of the seed-cells. This pin-support of the cut-off and the hour-glass-formed opening in the cut-off, through which the pin-support is passed, are such that when the cut-off is placed in position its free end will be held at too great a distance from the seed-wheel, but furnish the means for its proper adjustment, which is readily accomplished by pressure or the stroke of a hammer upon the upper side of the cut-off immediately over the supporting-pin to depress it in the center, as shown in Fig. 17. The outline conformation of the cut-off plate is such as to be received within the seed-box and within the curved inner edges of the bottom portions of the metallic ends thereof, and that its ends will be supported on the side edges of the bed-plate of the seeding mechanism.

The end edges of the cut-off plate are each provided centrally with a notch, which receives the lower tenon end of the slotted bars $k$, fixed to the opposite sides of the box in an adjustable and removable manner by means of a thumb-screw passed through the slotted bar. These slotted bars serve to hold the cut-off plate in position in the seed-box in a manner to be readily removed and replaced when from any cause it becomes necessary to remove it. It will be noticed that in this construction of a seeding mechanism the link-slide forms a portion of the surface over which the seed contained in the seed-cells is carried in the rotations of the seed-wheel, and that the link-slide crosses the path in which the seed-cells travel, and this compound movement of the reciprocating slide-link and the rotary movement of the seed-wheel operates to agitate the seed contained within the seed-cells, causing it to settle, and insures the complete and uniform filling of the cells.

At N is represented the main supporting-beam of the check-row attachment, placed crosswise of the machine on the forward fixed portion, $a'$, of the lid of the seed-box, to which it is fixed by means of a slotted metallic bracket, $k'$, and screw-bolt connection in a manner to permit a limited adjustment of the beam in the lengthwise direction of the machine to align the check-row deposit of the seed in the reverse or back and forth movements of the machine. The ends of the supporting-beam N of the check-row attachment are fitted with plate-bracket $k''$, securely fixed to the beam, and to the downturned end of the bracket-plate is fixed a sheave-supporting bar, $k'''$, projecting on both sides of the beam in the lengthwise direction of the machine, and having its sheave-supporting face inclined outward and downward between the vertical and horizontal forces exerted by the check-chain.

At $l$ are represented chain-carrying sheaves supported on the ends of the sheave-bars to revolve on suitable journal-supports.

At $l'$ are represented chain-guides fixed to the sheave-supporting bar, from which they rise in a suitable curve to the forward portion of the sheaves to overlap the track of the check-chain to such an extent as to control the entrance of the check-chain to the sheaves with certainty and prevent accidental displacement.

At N' is represented a bell-crank lever pivotally connected to the plate-bracket $k''$, to permit of a limited oscillation. The bell-crank lever N' is provided with a radial forked lever-arm, $l''$, having its forked open end extending across the path of the check-chain employed to operate the lever, in the usual manner.

Figure 1:
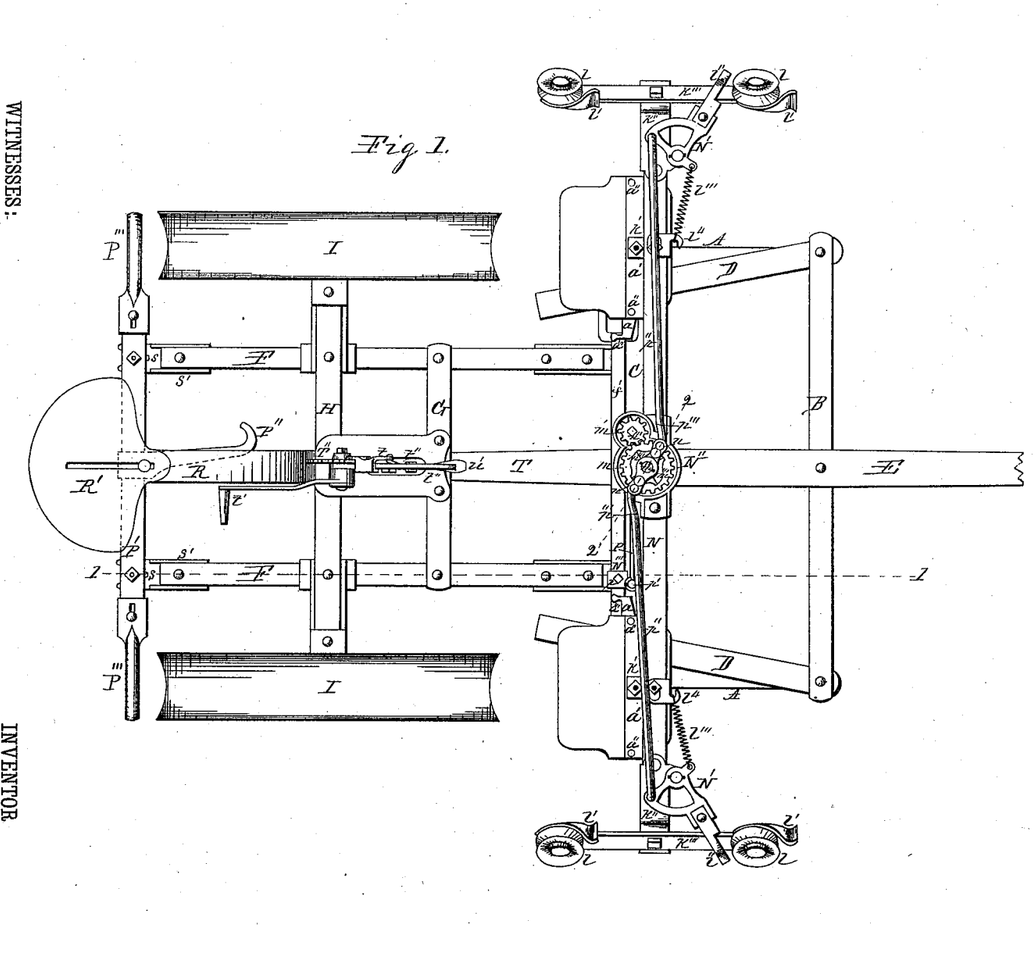
Figure 1 is a plan view of a machine embodying my invention.
Figures 2, 3, 4, 5, 6:
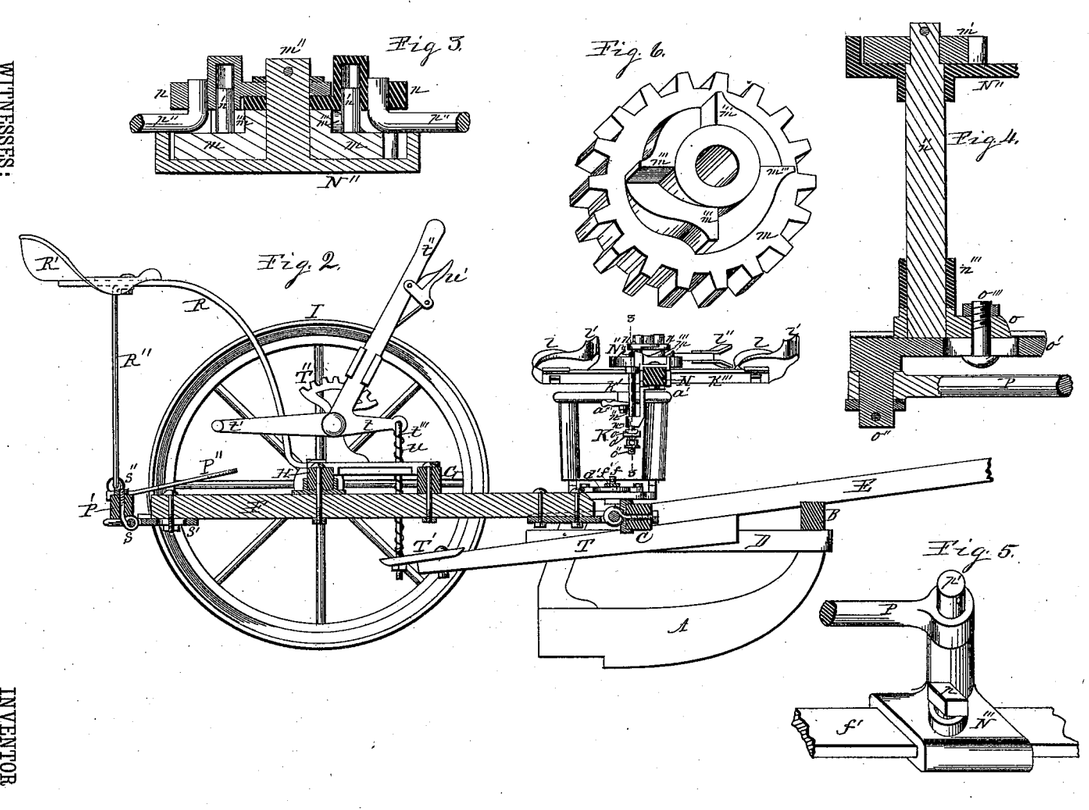
Fig. 2 is a vertical lengthwise section on dotted line 1 on Fig. 1.
Fig. 3 is a vertical section on dotted line 2 on Fig. 1.
Fig. 4 is a vertical section on dotted line 3 on Fig. 2.
Fig. 5 is an isometrical representation of the pitman-connection with the seed-slide.
Fig. 6 is an isometrical representation of the driving gear-wheel of the check-row attachment.
Figure 7:
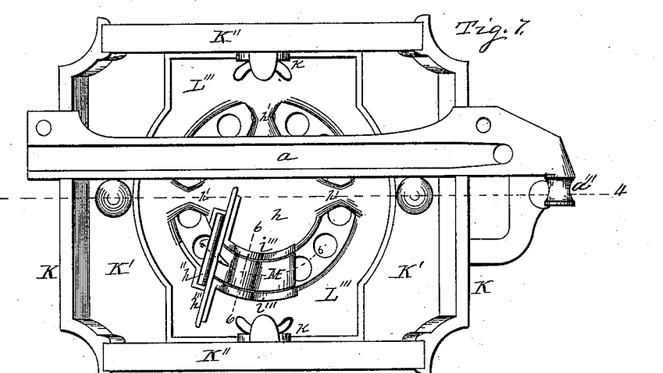
Fig. 7 is a plan view of the seed-box with wood cover removed.

At $l'''$ is represented a spring connected at one end with the bell-crank lever, and its other end is connected to the supporting-beam by means of a slotted hook-clip, $l^4$, made adjustable in its bolt-connection with the beam to vary the force of the spring action on the bell-crank to carry the forked lever to its forward position. (Shown in Figs. 1 and 2.)

By the employment of like pick-up and pay-out check-chain-supporting sheaves, placed to rotate in the same plane, and like check-chain guides in connection with the sheaves, I produce an efficient chain-carrier at a small cost, and the bisecting angle on which the sheaves are supported, between the downward force exerted upon them in picking up and paying out the chain and the outward force exerted in the swinging movement of the forked lever engaging the chain between the sheaves, serves to balance the forces to insure a free rotation of the sheaves on their journal-supports; and, further, the inclined position of the sheaves serves to resist the outward strain to which they are subjected in nearing the anchorage of the chain.

At N'' is represented a metallic gear-case of a suitable conformation to receive the two spur-toothed gear-wheels $m$ and $m'$. This gear-case is securely fixed centrally to the upper face of the beam-support of the check-row mechanism. The gear-wheel $m$ is supported to revolve within the gear-case on a stud-journal, $m''$, rising centrally in the larger chamber thereof. The gear-wheel $m$ is provided on its upper face, at equal intervals, with spirally-inclined clutch-arms $m'''$.

At $n$ are represented pawl-lever arms having a pivotal support on the stud-journal $m''$, above the gear-wheel, in such a manner as to be capable of independent oscillatory movements. These lever-arms $n$ are each fitted with a gravity or drop pawl, $n'$, in position to rest on the spirally-inclined upper face of the clutch-arms and engage the vertical faces thereof to carry the gear-wheel with the movement of the lever.

The spur-toothed gear-pinion $m'$ is fixed on the upper end of a vertical shaft, $n''$, supported at its upper end to revolve in a central bearing in the smaller chamber of the gear-case in such position relatively with the larger gear, $m$, that the teeth of the respective gears shall engage each other in working contact. The lower portion of the vertical shaft $n''$ is supported in a pendent bearing, $n'''$. To the depending end portion of the shaft is fixed an adjustable crank-head, consisting of a clutch-arm, $o$, fixed to the shaft, a slotted crank-arm, $o'$, with wrist-pin $o''$, made adjustable on the clutch-arm, and a clamping screw-bolt, $o'''$, passed through the slotted arm and through the clutch-arm $o$ on the side of the shaft opposite to the wrist-pin. By this construction and arrangement of the parts it will be seen that the wrist-pin is made adjustable to any point within the limits of the device, varying from a position coincident with its shaft-support to its greatest throw.

At $N'''$ is represented a clip of proper dimensions to receive the bar $f'$, connecting the slide-links of the seed mechanism, on which it is made adjustable and held in its adjusted position thereon by means of a set-screw, $p$. The upper portion of the clip $N'''$ is fitted at $p'$ in journal form.

At P is represented a pitman having its ends produced in eye form, one end of which receives the journal $p'$ of the clip, and its other end receives the wrist-pin $o''$ and serves to connect the crank with the slide-links of the seeding mechanism. By this connection of the parts it will be seen that if the vertical crank-shaft $n''$ is made to rotate a reciprocating movement will be imparted to the connecting-rod $f'$, which will be transmitted to the slide-links of the seeding mechanism.

At $p''$ are represented connecting rods having their ends bent in hook form to engage the bell-crank lever $N'$ and the lever-pawl arms $n$ on each side of the machine in such a manner that the action of the bell-crank lever, operated by the check-chain on either side of the machine, will impart a rotary movement through the gear-train to the crank-arm $o'$ to such an extent as to produce a semi-revolution of the crank. The connecting-rods $p''$ are of such conformation at the point $p'''$ as to engage the peripheral face of the clutch-arms $m'''$, to limit the rotation of the gear-wheel, and the relative size and position of the gear-wheels are such as to place the crank on its dead-centers relatively with the pitman connecting it with the connecting-bar of the slide-links.

The construction and arrangement of the gear-wheel, with its inclined clutch-arms, the lower pawl-arms, and the drop-pawls are such that the drop-pawl on the side opposite the side employed to operate the seed-dropping mechanism operates as a detent-pawl to prevent the return movement of the gear-wheels or of the parts connected therewith.

At $P'$ is represented a scraper-bar of suitable dimensions, having a hinged connection at $s$ to the metallic plate $s'$, fixed to the rear ends of the side beams, F, of the wheel-frame in a manner to permit a forward rolling movement of the bar. To the center of the scraper-bar is fixed a foot-pedal, $P''$, extending forward obliquely toward the right-hand side of the machine.

At $P'''$ are represented scrapers fixed to the end portions of the scraper-bars. These scrapers are of proper conformation in section to disengage the adhering earth from the wheels, preferably concave in section and curved to engage the concave surface of the wheel when rolled forward, and are made interchangeable and reversible.

At R is represented a seat-support fixed at its forward end to the wheel-frame, from which it rises in an upward and rearward curve, having its rear end portion provided with a seat, $R'$, made adjustable in its connection with the support, lengthwise of the machine, to properly balance the machine when in use.

At $R''$ is represented a vertical support to the seat, fixed at its upper end to the seat-support and at its lower end hinge-jointed to the scraper-bar at a point, $s''$, rearward of the hinge-joint connection of the bar with the metallic plate, so that the weight of the seat and the operator will operate to hold the scrapers disengaged from the wheels, but in such a manner that the operator can depress the foot-pedal and hold the scrapers in contact with the wheels.

At T is represented an extension of the tongue, fixed to the under side of its rear end, from which connection it extends rearward under the wheel-frame. The rear end of the tongue-extension is provided with a metallic plate, $T'$, fixed to its upper face and extending rearward of the extension-beam.

At $T''$ is represented a segment-toothed ratchet having a bracket-foot connection with the wheel-frame. To the axial center of the toothed segment is pivoted a tri-armed lever, consisting of the supporting-arm $t$, the pedal-arm $t'$, and the hand-lever arm $t''$. The supporting-arm $t$ of the lever is connected to the metallic plate on the tongue-extension by a link, $t'''$, hinge-jointed to the lever-arm, and extending through a suitable opening in the metallic plate to permit a free up-and-down movement of the plate on the link. The depending end of the link is provided with a screw-nut to engage the under face of the plate to prevent the withdrawal of the link, and also to vary the distance between the plate and lever. A spiral spring, $u$, surrounds the link $t'''$ between the supporting-arm of the lever and the metallic plate on the tongue-extension in such a manner that its spring action tends to separate the lever and the tongue-extension, but capable of yielding to permit the runners to override inequalities of the surface of the ground with but little vibrations of the tongue.

The hand-lever $t''$ is provided with a thumb-lever, $u'$, having a link-connection with a spring-actuated bolt-detent of ordinary construction to engage the teeth of the segment-ratchet to hold the parts in their adjusted position, and the lever serves as a means by which the operator can depress the rear end of the runner-frame or adjust it to run at a proper depth, and, in connection with the pedal-arm $t'$, enables the operator to elevate the rear end of the runner-frame to relieve it from contact with the ground, and the spring-actuated pawl, in connection with the segment-ratchet, serves to hold the parts in their adjusted position.

I claim as my invention—

1. The combination, with a combined iron and wood seed-box, substantially as described and shown, of a metallic bar spanning the box connecting the metallic ends, said bar having its inner end fitted in lateral journal form, substantially as and for the purpose set forth.

2. In a seeding mechanism, substantially as described, a bed-plate provided with parallel grooves to receive an operating-slide, cam-grooves to control the lateral movements of operating-pawls, cam-grooves to control the lateral movements of detent-pawls, openings to receive the operating-jaws of the flipper-valve, and a seed-opening to admit the seed to the seed-spout, substantially as described and shown.

3. The combination, with a bed-plate provided with parallel grooves to receive an operating-slide, of an operating-slide fitted to the parallel grooves and capable of an endwise sliding movement therein, said slide having its upper face in the same plane with the upper face of the bed-plate and forming a portion thereof, substantially as and for the purpose set forth.

4. The combination, with the grooved bed-plate and with an operating-slide supported to reciprocate within the grooved ways in the bed-plate, of a seed-wheel, substantially as herein described, supported to rotate on the bed-plate, substantially as and for the purpose set forth.

5. The combination, with a bed-plate, a reciprocating slide forming a portion of the surface on which the seed-wheel rotates, and a seed-wheel, of operating-pawls, said pawls having a pivotal connection with the reciprocating slide and controlled in their lateral movements by the cam-grooves in the bed-plate to impart an intermittent rotary movement to the seed-wheel, substantially as and for the purpose set forth.

6. The combination, with a bed-plate, a reciprocating slide, and a seed-wheel, of detent-pawls, said pawls having a pivotal connection with the reciprocating slide and controlled in their lateral movements by cam-grooves in the bed-plate to limit the rotary movement of the seed-wheels, substantially as and for the purpose set forth.

7. The combination, with a bed-plate, a reciprocating slide, and a seed-wheel, of operating and detent pawls having a pivotal connection with the slide and both controlled in their lateral movements by their connection with the bed-plate to impart a limited intermittent rotary movement to the seed-plate, substantially as and for the purpose set forth.

8. The combination, with a rotary seed-wheel provided with seed-cells, of an operating reciprocating link-slide, said slide located to reciprocate across the path of the seed-cells of the seed-wheel in contact with the seed, substantially as and for the purpose set forth.

9. The combination, with a bed-plate, seed-box, and seed-wheel, of an interchangeable operating-slide of rectangular link form carrying operating and detent pawls to engage the said wheel and provided with depending jaws on its opposite sides to engage the flipper-valve and with a stud-journal to receive a connecting-bar, substantially as set forth.

10. The combination, with the bed-plate, with its parallel grooves, the seed-tube, the flipper-valve located therein, and the seed-box, of the link-slide adapted to reciprocate in the groove in the bed-plate in contact with the seed, and carrying mechanism for operating the flipper-valve in the seed-tube, substantially as set forth.

11. The combination, with the guard-plate, of a spring-actuated lever cut-off located within the annular opening of the plate, said cut-off having a hinged connection with the plate and held in its hinged connection therewith in a yielding manner by a rod or bar spring spanning the cut-off near its hinged connection, substantially as and for the purpose set forth.

12. The combination, with the spring-actuated cut-off, of a transverse pin-support extending through the opening in the lever cut-off, substantially as and for the purpose set forth.

13. The combination, with inclined sheave-supporting bar and the inclined sheaves journaled thereon, of the curved guards, as $l'$, extending forwardly from the sheave-support over the track of the chain, whereby the chain is gently directed into alignment with its seat on the sheave in advance of its contact therewith and accidental displacement avoided, substantially as set forth.

14. The combination, with the beam-support of the check-row mechanism, of a gear-wheel with spirally-inclined clutch-arms mounted to revolve on a suitable bearing centrally on the beam-support and lever-pawl arms supported to oscillate on the axial center of the gear-wheel and capable of independent action, substantially as and for the purpose set forth.

15. The combination, with the beam-support of the check-row mechanism, of a gear-case fixed centrally to the beam, a gear-wheel with spirally-inclined clutch-arms mounted to revolve within the case, and lever-pawl arms supported to oscillate on the axial center of the gear-wheel and capable of independent action to impart an intermittent rotary movement to the gear-wheel, substantially as and for the purpose set forth.

16. The combination, with the lever-pawl arms and with the spiral clutch-arms of the gear-wheel, of gravity or drop pawls, substantially as and for the purpose set forth.

17. The combination, with a vertical shaft depending from the beam-support of the check-row mechanism and supported to revolve in suitable bearings, and with the gear-wheel provided with spirally-inclined clutch-arms, of a gear-toothed pinion mounted upon the vertical shaft to engage the teeth of the gear-wheel, substantially as and for the purpose set forth.

18. The combination, with the spiral clutch-arms of the gear-wheel, of a link connecting the bell-crank with the lever-pawl, said link to engage the peripheral face of the clutch-arms to limit the rotary movement of the gear-wheel, substantially as and for the purpose set forth.

19. The combination, with the gear-wheel provided with inclined clutch-arms, of independent lever-pawl arms supported to oscillate on the axial center of the wheel, each of said levers provided with a gravity or drop pawl to engage the clutch-arms of the gear-wheel, operating on one side as a driving-pawl to impart an intermittent rotary movement to the gear-wheel and on the opposite side as a detent to prevent a return movement thereof, substantially as set forth.

20. The combination, with the wheel-frame, with the supporting-wheels, and with the seat-support, of a scraper-bar with scrapers fixed to its ends, said bar having a hinged connection with the rear end of the frame to permit an overrolling movement of the bar, and with the seat-support to hold the scrapers disengaged from the wheels, substantially as set forth.

21. The combination, with the swinging scraper-bar and with the seat, of a vertical support connecting the seat with the scraper-bar, substantially as and for the purpose set forth.

22. The combination, with the scraper-bar having a hinged connection with the supporting-frame and with the seat-support, of a foot-lever fixed to the scraper-bar, substantially as and for the purpose set forth.

JAMES HERVA JONES.

Witnesses:
FRANK D. EMERSON,
A. O. BEHEL.